UNITED STATES PATENT OFFICE.

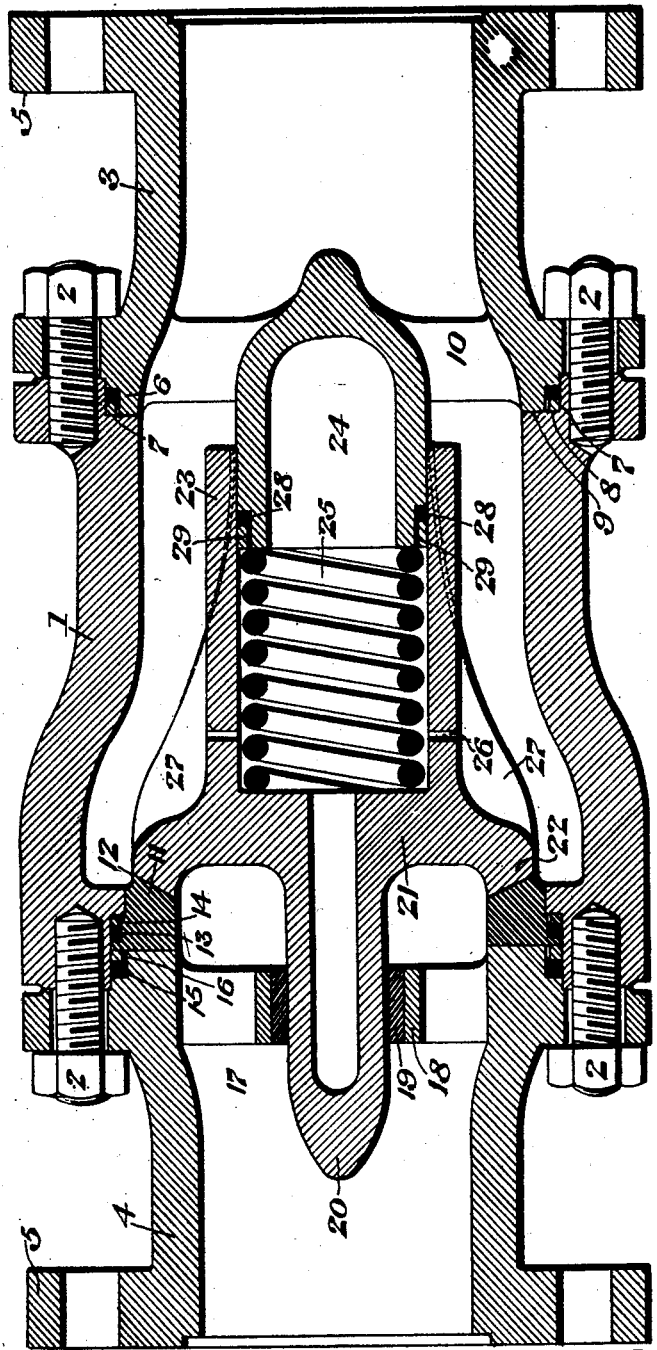

SAMUEL S. CASKEY, OF PHILADELPHIA, PENNSYLVANIA, ASSIGNOR TO CASKEY VALVE COMPANY, OF PHILADELPHIA, PENNSYLVANIA, A CORPORATION OF NEW YORK.

CHECK-VALVE.

1,105,255.  Specification of Letters Patent.  Patented July 28, 1914.

Application filed February 14, 1910. Serial No. 543,790.

*To all whom it may concern:*

Be it known that I, SAMUEL S. CASKEY, a citizen of the United States, residing in the city and county of Philadelphia, State of Pennsylvania, have invented a new and useful Check-Valve, of which the following is a specification.

This invention relates to check valve structures and more particularly to valves of this type which are to be used in high pressure systems and has for an object to provide a valve adapted to carry fluid under high pressure without leaking around the joints, connections or the like and furthermore one which remains accurately seated and whatever wear takes place upon the seat is substantially uniform and the necessity of regrinding the valve at intervals is eliminated.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

The figure represents a section through a check valve embodying my invention.

Similar numerals of reference indicate corresponding parts in the figures.

Referring to the drawings: 1 designates the body portion of the casing of my novel valve structure, the same having secured thereto in the present instance, by means of stud bolts 2 or equivalent devices, extensions 3 and 4 which have preferably integral therewith flanges 5 serving to connect the valve to adjacent fittings. The body portion 1 is counterbored at one end to receive an off set 6 of the extension 3, the joint of which is protected by means of a packing 7, whereby leakage between the two parts is effectually prevented. In connection with this packing 7 it will be noted that a port 8 forms a communication between the joint 9 and the back of the said packing whereby any fluid escaping along the joint will be conducted back of the said packing and hold the same in place to prevent escape to the exterior of the valve. The other end of the body portion 1 is also counterbored and preferably ground to receive an annulus 11, here shown as provided with a beveled face 12, which latter forms the seat of the said valve. In order to prevent escape of fluid between the two parts a suitable packing 13 is provided while ports 14 are formed in the annulus to conduct the escaping pressure fluid back of the packing to compress the same more effectually to its work. A similar packing 15 is provided in the extension 4 to prevent leakage between it and the body portion 1 and ports 16 are also provided to conduct the pressure fluid back of the packing for a like purpose.

17 designates, in the present instance, a spider structure preferably integral with the extension 4 and having a hub 18 at substantially the center thereof and carrying therein a wear bushing 19 with which engages the stem 20 of the valve closure 21. This valve closure 21, as herein disclosed, is provided with a bevel face 22 conforming to and co-acting with the seat 12 of the annulus 11, the two being accurately ground in order to form a tight joint when the parts are in contact.

23 designates a tubular member forming, in the present instance, a part of the closure 21 and adapted for sliding engagement with an abutment 24, which forms a hub of a spider structure 10, the latter being integral with the extension 3.

25 designates a spring within the tubular member 23 and abutting at one end the closure 21 and at the other the member 24, whereby the closure is normally held seated. It will of course be apparent that any pressure exerted on this closure 21 which is sufficient to overcome the tension of the spring 25 will cause the valve to open and permit a flow from one side thereof to the other. In order that the spring action may not return the valve too quickly to its seat, thus avoiding a sudden snap action, I preferably provide a plurality of ports 26 forming a communication with the interior of the tubular member 23 and serving to produce a dash pot effect by retarding the escape of any fluid which may have entered the space within the tubular member 23.

27 designates a plurality of wings or flanges preferably formed integral with the closure 21 and serving as blades with which the fluid in passing through the valve engages and produces a shifting of the closure, thus continuously changing the seat and preventing wearing at any particular point. If desired, packings as 28 may be inserted between the abutment 24 and tubular member 23 to increase the dash pot action and in connection therewith the ports 29 are formed to conduct the pressure fluid back of the packing to produce a more efficient result.

Attention is particularly directed to the feature of providing a removable valve seat, since it thereby becomes a simple and easy matter, in case regrinding of the seat is necessary, to take the part out of the casing and form a new seat therein. In the present instance I have shown an annulus having a seat therein and it may be readily removed at any time it is desired to retard the inner valve parts.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a device of the character stated, a body portion, extensions secured to said body portion, a valve seat removably secured with respect to said body portion, a closure having a stem with a chamber, a tubular extension forming a chamber and having a port through the wall thereof, and with which chamber the chamber of said stem communicates, a hub having a chamber carried by one extension and adapted for sliding engagement with said tubular extension, with the chamber thereof in communication with the chamber of said tubular extension, said port being adapted to retard the escape of fluid from all of said chambers and compressible means to maintain said closure normally in contact with said seat.

2. In a device of the character stated, a body portion, extensions secured to said body portion, packing between each extension and said body portion, a valve seat removably secured with respect to said body portion, packing between said seat and body portion, a closure having a stem with a chamber, a tubular extension forming a chamber and having a port through the wall thereof, and with which chamber the chamber of said stem communicates, a hub having a chamber carried by one extension and adapted for sliding engagement with said tubular extension, with the chamber thereof in communication with the chamber of said tubular extension, said port being adapted to retard the escape of fluid from all of said chambers, a guide for said stem for insuring proper movement of said closure, and compressible means for normally holding said closure in contact with said seat.

SAMUEL S. CASKEY.

Witnesses:
WM. CANER WIEDERSEIM,
C. D. McVAY.